W. A. RAMSAY.
FRICTION CLUTCH.
APPLICATION FILED APR. 4, 1912.
1,063,064.
Patented May 27, 1913.
4 SHEETS—SHEET 2.
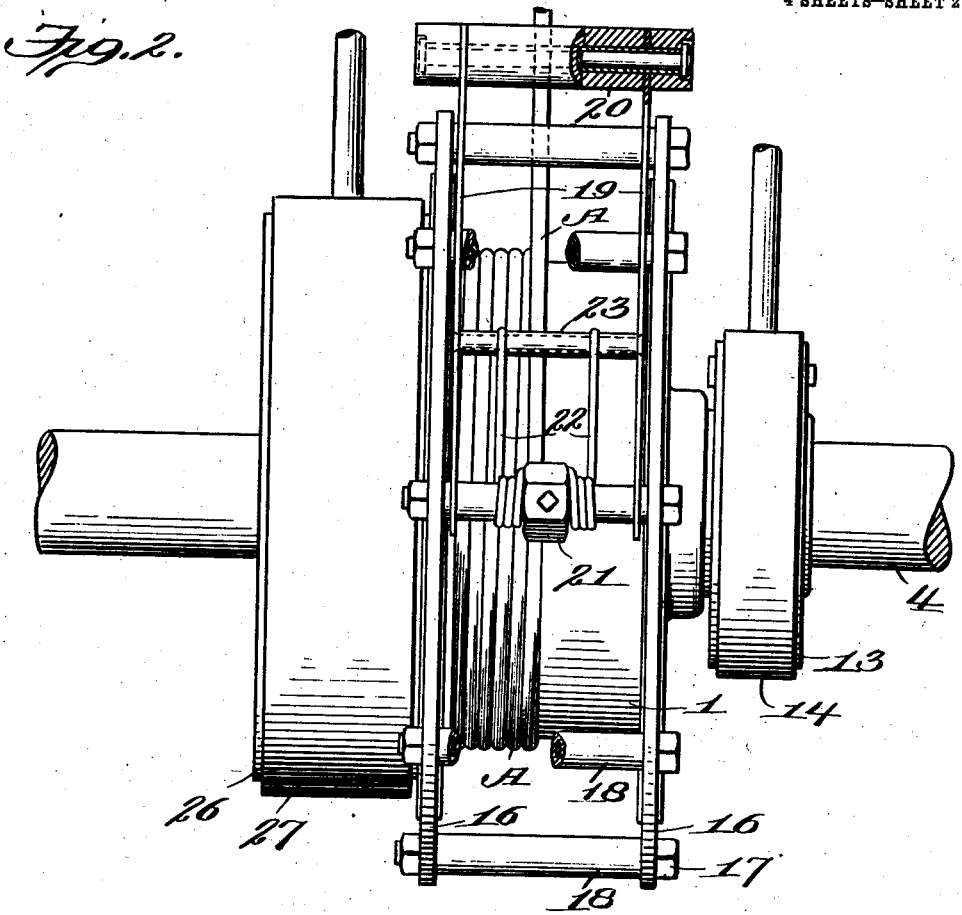
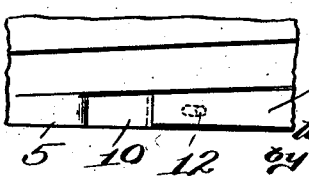
Witnesses:
Inventor
William Arthur Ramsay
by
James L. Norris
Atty.

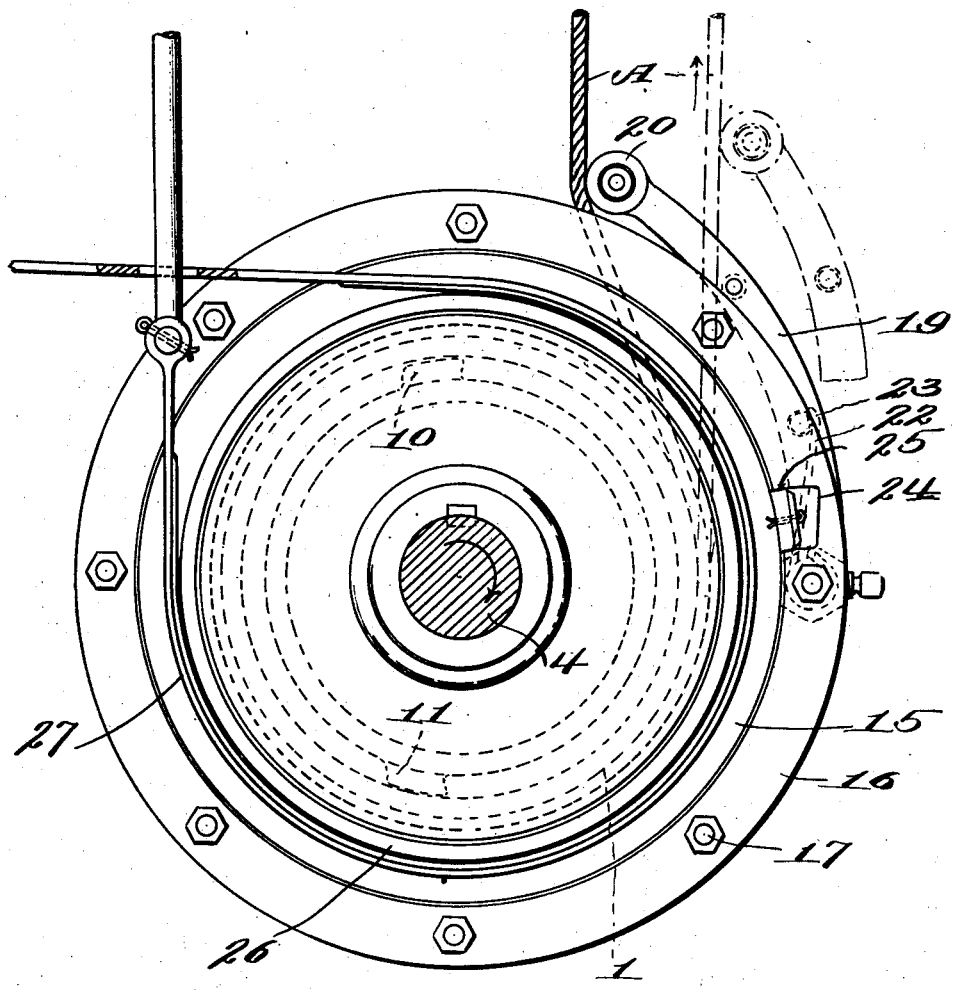

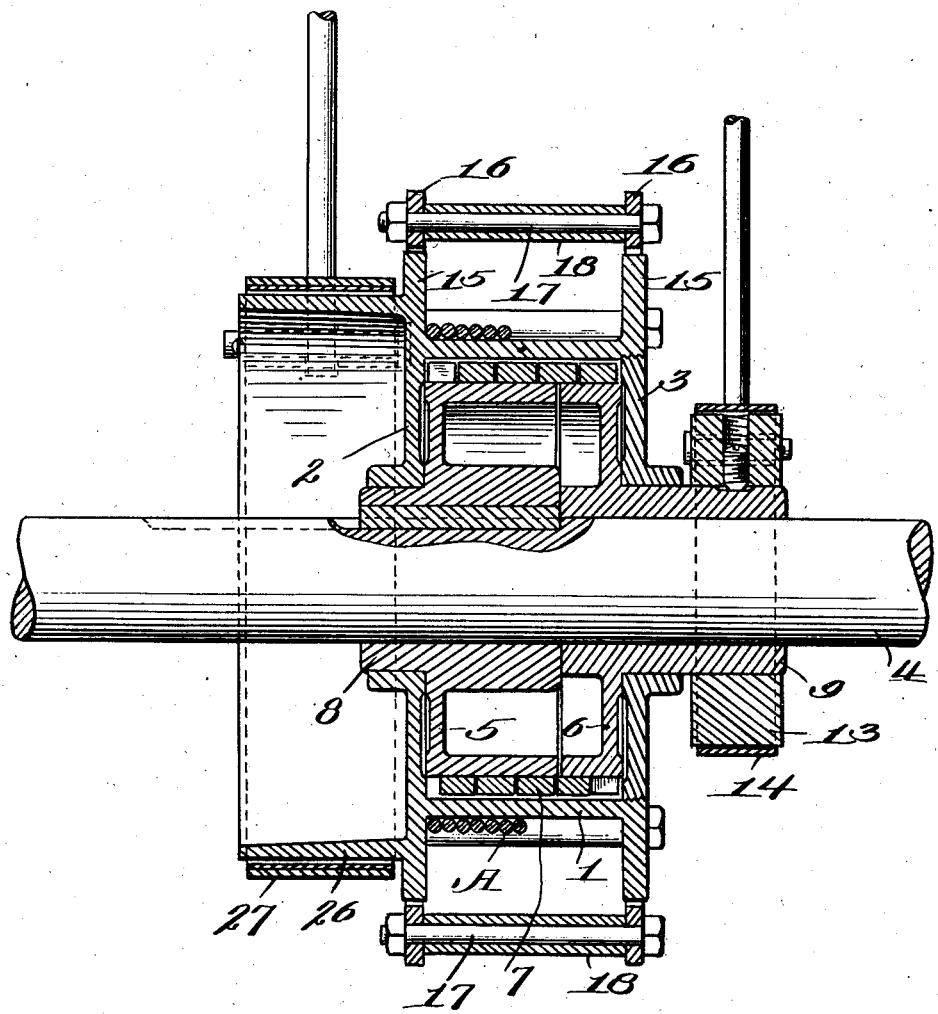

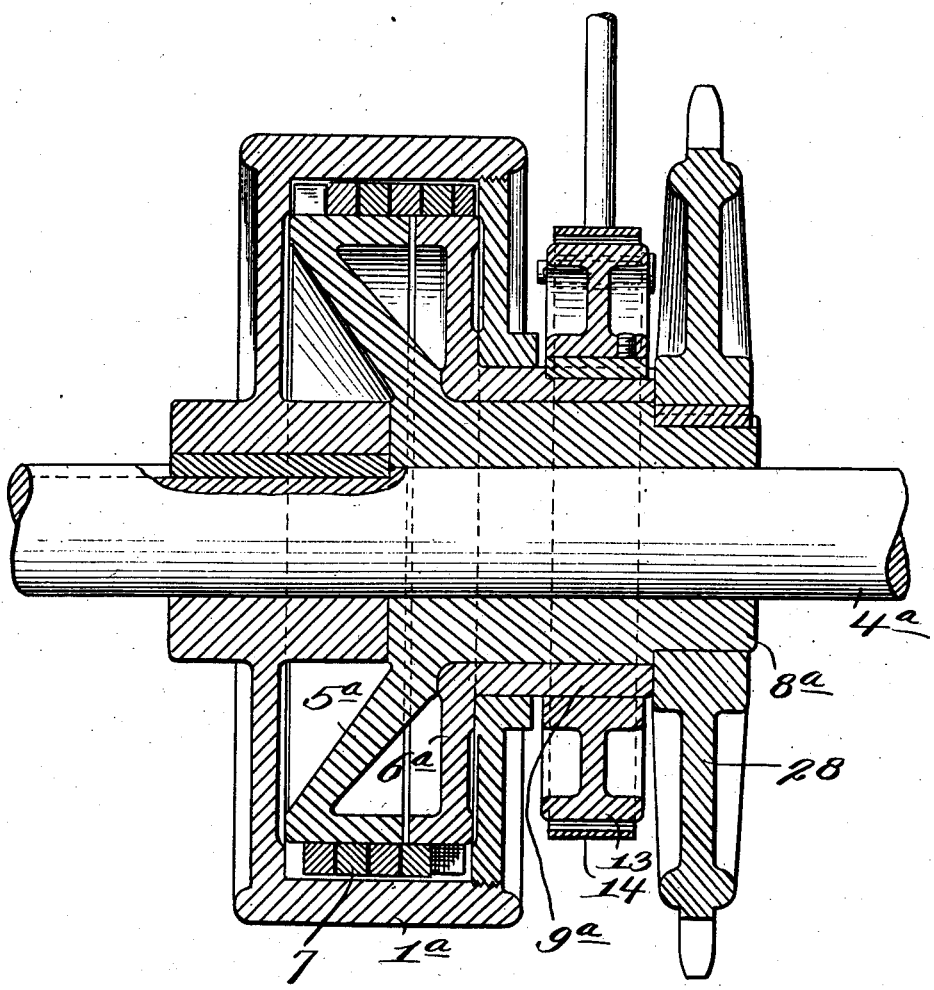

UNITED STATES PATENT OFFICE.

WILLIAM ARTHUR RAMSAY, OF HONOLULU, TERRITORY OF HAWAII.

FRICTION-CLUTCH.

1,063,064.  Specification of Letters Patent.  Patented May 27, 1913.

Application filed April 4, 1912. Serial No. 688,407.

*To all whom it may concern:*

Be it known that I, WILLIAM ARTHUR RAMSAY, a subject of the King of Great Britain, residing at Honolulu, in the county of Honolulu and Territory of Hawaii, have invented new and useful Improvements in Friction-Clutches, of which the following is a specification.

This invention relates to improvements in friction clutches of that general type wherein the driving and driven elements are put into operative relation by means of an interposed coil spring.

The principal objects of the invention are to provide a clutch of the type stated which shall be very simple in its structural details; wherein the operating parts are inclosed and protected against dust or moisture; and wherein wear is reduced to a minimum and there is little, if any, liability of breakage.

A further object of the invention is to provide a clutch which is especially applicable for use as an element of a hoisting mechanism, and which, in such use, has combined therewith certain novel adjuncts which insure the efficiency of the hoisting operation.

The invention is illustrated in the accompanying drawings, wherein:

Figure 1 is a side elevation of the improved clutch in a form enabling its use as an element of a hoisting mechanism; Fig. 2 is a front elevation thereof, the brake shoe of the braking mechanism being omitted to promote clearness of illustration. Fig. 3 is a cross sectional view; Fig. 4 is a detail sectional view, showing the relation of the coil spring and one of the clutch parts with which it coöperates; Fig. 5 is a developed plan view of the features shown in Fig. 4; and Fig. 6 is a cross sectional view showing a modified or alternative construction, adapting the clutch to another application.

Similar characters of reference designate corresponding parts throughout the several views.

Fig. 1 shows the improved clutch applied to use as an element of a hoisting machine, *e. g.* in a cane loading machine where the load is comparatively heavy and the shocks are somewhat sudden. The driven member, as 1, is, in this instance, in the form of a drum by means of which the hoisting or hauling cable A is taken in or paid out. The member 1 includes a fixed head 2 and a removable head 3, the latter being threaded into said member at one side thereof. The member 1 is driven by a shaft 4 and the connections for putting said member into relation with said shaft include a pair of drums 5 and 6, and a coil spring 7. The drums 5 and 6 are of the same diameter and are inclosed within the member 1 immediately adjacent one another, their respective hubs 8 and 9 passing through the heads 2 and 3 of the member 1 and affording bearings for the latter. The drum 5 is keyed on the shaft 4 and the drum 6 is loose on said shaft. Said drums furnish common support for the coil spring 7, the latter being interposed between their peripheral surfaces and the inner circumferential surface of the drum 1. The ends of the spring 7 come adjacent driving lugs 10 and 11 provided on the members 5 and 6 respectively, and said spring may, if desired, be secured to one of the drums, *e. g.* the drum 5, as by a pin 12. The lugs 10 and 11 are located slightly inwardly of the heads 2 and 3 and the total width of the spring 7, corresponding to the spacing of said lugs from one another in the direction of the axis of the clutch, is such that said spring will have no frictional contact with said heads and consequently, when not engaged with the drum 1, will not interfere with the free running thereof. A brake disk 13 is secured upon the hub 9 of the drum 6, to turn therewith, and for coöperation with a band 14. The spring 7, being confined between the lugs 10 and 11, serves to transmit the motion of the drum 5 to the drum 6, the latter, however, as stated above, running loosely on the shaft 4. The natural tendency of the spring 7 is to contract, and thereby be out of contact with the inner circumferential surface of the member 1. When, however, it is desired to actuate the member 1, the band 14 is tightened upon the peripheral surface of the disk 13, so as to retard the rotation of the drum and thereby cause the spring 7 to expand into contact with the adjacent surface of the member 1. The degree to which the band 14 is tightened depends upon the load and can be very readily determined by the engineer in charge; in any event, it will be comparatively slight, insufficient to break or unduly wear the lining of the band, because of the relatively large engaging surface of the spring 7. As stated above, the member 1 has the form of a drum and as such it not only includes the winding surface but side flanges 15, between which the cable A is coiled. To prevent the cable from coiling upon the outside of said flanges a suitable guard is employed, this guard comprising rings 16 which surround the flange 15, and are connected by bolts 17, and spaced by sleeves 18, which surround said bolts. To prevent the continued rotation of the drum after the cable has been unwound therefrom to the extent desired, an automatic brake device is provided. As shown, this device comprises a pair of arms 19 which are pivoted on one of the sleeves 18 and, together, support a roller 20 at their outer ends. Upon the sleeve 18 which serves as the pivot of the arms 19 a nut 21 is fixed and to this the coiled ends of springs 22 are secured. The arms of these springs bear against a bolt or cross piece 23 which connects the arms 19, and tend to move said arms inwardly on their pivot. Closely adjacent their pivot the arms carry a transverse brake shoe 24 (Fig. 1), which, in the instance disclosed, works in recesses 25 of the rings 16 and coacts with the flanges 15. When the cable is under tension and is being unwound, as indicated in Fig. 1, by dotted lines, the arms 19 are held in their outward positions and against the tension of the springs 22, the brake shoe 24 being thus held away from the flanges 15. When, however, the tension on the cable is relieved, the springs 22 move the arms 19 inwardly, as indicated in full lines, and the brake shoe 24 is thereby brought into strong frictional contact with the peripheral faces of the flanges 15, so as to arrest the further rotation of the drum 1. The drum 1 may be provided at one side thereof with a brake flange 26 for coöperation with a brake band 27, the office of which is to arrest the rotation of the drum when it is desired to retain the load in a hoisted position.

The construction shown in Fig. 6 differs from that shown in Fig. 1 only in matters of detail. This construction is adapted for an application wherein the member 1$^a$ (corresponding to the member 1) is the driven element and transmits power to the shaft 4$^a$ (corresponding to the shaft 4). As an instance of such an application, the head shaft drive of a cane carrier, (shown, for example, in the Moore Patent No. 655,906, of Aug. 14, 1900,) may be mentioned and this embodiment will be explained with reference to this particular application, the shaft 4$^a$ being for this purpose considered as the head shaft. The member 1$^a$ is generally similar to the member 1 above referred to, although it is merely drum shaped and is not functionally a drum. The member 1$^a$ is keyed to the shaft 4$^a$ and incloses the drums 5$^a$ and 6$^a$, (corresponding to the respective drums 5 and 6.) The drums 5$^a$ and 6$^a$ have flush peripheral surfaces and maintain the spring 7 in the relation previously explained. In this instance the hub 8$^a$, (corresponding to the hub 8,) projects through the hub 9$^a$, (corresponding to the hub 9) and carries the sprocket wheel 28, (ordinarily employed in this particular instance) to which power is transmitted by a suitable chain (not shown). The brake disk 13 is mounted upon the hub 9$^a$ and is engaged by the band 14, to retard the rotation of the drum 6$^a$ and thereby expand the spring 7 into contact with the inner circumferential face of the member 1$^a$, whenever it is desired to drive the shaft 4$^a$. When the disk 13 is released, the spring 7 contracts and the drums 5$^a$ and 6$^a$ turn with the sprocket wheel 28, but free of the member 1.

It will be apparent from the foregoing description that a clutch in accordance with the invention has a number of substantial advantages. The arrangement of the drums within the member 1 or 1$^a$, as the case may be, is of very simple nature and is very satisfactory, since it enables the use of a spring of ample strength and extent and provides a good and uniform supporting surface upon which the spring may snugly contract when the member 1 or 1$^a$ is relatively free, whereby said drums will rotate uniformly and without noise or vibration. At the same time, the arrangement permits of inclosing the essential operating parts within the member 1 or 1$^a$ and thereby protecting them against dust or moisture. The organization is also very strong and embodies no parts which are peculiarly subject to wear, fracture, or displacement.

Having fully described my invention, I claim:

1. In a clutch, a rotatable drum shaped member, a pair of rotatable drums inclosed within the drum shaped member and having flush peripheral surfaces, a coil spring normally contractile upon the drums and interposed between the peripheral surfaces thereof and the inner circumferential surface of said member, the member and the drums being correlated to the spring as companion parts, and the drums being provided with driving lugs for engagement with the ends of said spring, one of the companion parts constituting a driving element, another a driven element, and the third, together with the spring, a means of connection between the driving element and the driven element, and means for moving the third part against the tension of the spring to cause the latter to put the driving and driven elements into operative relation.

2. In a clutch, a rotatable drum shaped member having heads at each end thereof, one of the heads being removable, a pair of rotatable drums inclosed within the drum shaped member and having flush peripheral surfaces, a coil spring arranged upon the drums and interposed between the peripheral surfaces thereof and the inner circumferential surface of said member, the member and the drums being correlated to the spring as companion parts and the drums being provided with driving lugs for engagement with the ends of said spring, one of the companion parts constituting a driving element, another a driven element, and the third, together with the spring, a means of connection between the driving element and the driven element, and means for moving the third part against the tension of the spring to cause the latter to put the driving and driven elements into operative relation.

3. In a clutch, a rotatable drum shaped member, a pair of rotatable drums inclosed within the drum shaped member and having flush peripheral surfaces, a coil spring normally contractile upon the drums and interposed between the peripheral surfaces thereof and the inner circumferential surface of said member, the drums having driving lugs engaging the extremities of the spring and the latter transmitting the rotation of one drum to the other drum, and means for moving one of the drums with relation to the other drum whereby to expand the spring into engaging contact with the inner circumferential surface of the drum shaped member.

4. In a clutch, a rotatable drum-shaped member, a pair of rotatable drums inclosed within the drum-shaped member and having flush peripheral surfaces, a coil spring normally contractile upon the drums and interposed between the peripheral surfaces thereof and the inner circumferential surface of said member, the drums having driving lugs engaging the extremities of the spring and the latter transmitting the rotation of one drum to the other drum, the drum-shaped member having hubs at the ends thereof, one of the drums having a hub which projects through and beyond the adjacent hub, and means associated with said hub to retard the rotation of the drum by which the hub is carried with relation to the other drum and to thereby expand the spring into engagement with the inner surface of said drum-shaped member.

In testimony whereof I have hereunto set my hand in presence of two subscribing witnesses.

WILLIAM ARTHUR RAMSAY.

Witnesses:
   O. K. FRANCA,
   F. W. MAKINNEY.